United States Patent
Menninga et al.

(10) Patent No.: US 8,234,571 B1
(45) Date of Patent: Jul. 31, 2012

(54) PREDICTIVE TEXT COMPOSITION

(75) Inventors: Eric A. Menninga, Seattle, WA (US); Douglas Waterfall, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1029 days.

(21) Appl. No.: 11/639,697

(22) Filed: Dec. 15, 2006

(51) Int. Cl.
*G06F 17/00* (2006.01)

(52) U.S. Cl. ........ 715/256; 715/243; 715/254; 715/255; 715/273

(58) Field of Classification Search .................. 715/240, 715/235, 243, 255, 256, 273, 254
See application file for complete search history.

(56) References Cited

U.S. PATENT DOCUMENTS

| | | | | |
|---|---|---|---|---|
| 5,579,467 | A * | 11/1996 | Capps | 715/200 |
| 6,003,066 | A * | 12/1999 | Ryan et al. | 709/201 |
| 6,223,191 | B1 * | 4/2001 | Truelson | 715/205 |
| 6,510,441 | B1 | 1/2003 | Kenninga | |
| 7,020,838 | B2 * | 3/2006 | Tsykora | 715/241 |
| 7,197,695 | B2 * | 3/2007 | Williamson et al. | 715/251 |
| 7,310,771 | B2 * | 12/2007 | Burago et al. | 715/210 |
| 7,516,402 | B2 * | 4/2009 | Koivisto et al. | 715/238 |
| 7,596,752 | B2 * | 9/2009 | Marks et al. | 715/255 |
| 7,640,499 | B2 * | 12/2009 | Kato | 715/272 |
| 7,681,121 | B2 * | 3/2010 | Nishikawa et al. | 715/243 |
| 7,770,111 | B2 * | 8/2010 | Burago et al. | 715/256 |
| 2006/0294460 | A1 * | 12/2006 | Chao et al. | 715/520 |
| 2007/0150808 | A1 * | 6/2007 | Harrington | 715/523 |
| 2008/0288859 | A1 * | 11/2008 | Yuan et al. | 715/234 |

* cited by examiner

*Primary Examiner* — Stephen Hong
*Assistant Examiner* — Matthew Ludwig
(74) *Attorney, Agent, or Firm* — Fish & Richardson P.C.

(57) ABSTRACT

Systems, methods, and apparatus, including computer program products for text composition are provided. In some implementations, a method is provided. The method includes processing a plurality of paragraphs in parallel, including defining a paragraph layout for each paragraph, the paragraph layout including line breaks. The method further includes composing the text in an electronic document including serially composing each paragraph, the serial composing including shuffling the processed paragraphs into a particular position within a page frame of the electronic document.

27 Claims, 3 Drawing Sheets

PREDICTIVE TEXT COMPOSITION

BACKGROUND

This specification relates to text composition.

Text composition includes laying out text within a frame of one or more pages of an electronic document. Text to be composed typically includes a number of individual paragraphs. Composition of the paragraphs includes a selection and a placement of line breaks to produce a visually pleasing appearance and positioning the paragraph within a page frame of the electronic document. Changes in the style of the text, e.g., fonts, formats, line heights, and point size, can complicate text composition. In addition, text styles and shape complexity can significantly increase computational overhead and processing time.

Techniques exist for determining line breaks in a paragraph (i.e., defining a paragraph layout) during text composition. Many techniques implement a line by line approach. Line by line techniques generally start with a first line, assign penalty values for possible breaks in that line, and choose the best possible line break for that line. After the first line is defined, a second line is analyzed and defined in a similar manner. Line by line techniques continue through a paragraph, defining each line and moving on to the next. Each paragraph is serially processed line by line until the entire text has been composed.

Additionally, paragraphs for which line breaks have been determined can be shuffled within the electronic document. Shuffling involves positioning paragraphs by moving them (e.g., up or down) within the electronic document without redefining the paragraph layout. However, shuffling can only be done if the destination position in the page has the same frame width as the initial position.

SUMMARY

Systems, methods, and apparatus, including computer program products for text composition are provided. In general, in one aspect, a method is provided. The method includes processing a plurality of paragraphs in parallel, including defining a paragraph layout for each paragraph, the paragraph layout including line breaks. The method further includes composing the text in an electronic document including serially composing each paragraph, the serial composing including shuffling the processed paragraphs into a particular position within a page frame of the electronic document.

Implementations of the method can include one or more of the following features. Processing the plurality of paragraphs can further include identifying a predicted frame width for the document and determining the line breaks for each paragraph using the predicted frame width. The composing can further include determining if the predicted frame width corresponds to the actual frame width for each paragraph and if the actual frame width is different from the predicted frame width for a paragraph, redefining the paragraph layout using the actual frame width.

Processing a plurality of paragraphs in parallel can include assigning a first paragraph to a first processing thread and assigning a second paragraph to a second processing thread. Processing a plurality of paragraphs in parallel can also include determining that the first processing thread has completed processing of the first paragraph and assigning a next paragraph to the first processing thread. Each paragraph of the plurality of paragraphs can be placed in a queue and assigned to a particular processing thread according to a position in the queue.

The plurality of paragraphs can be ordered within a text flow, the method can further include performing the parallel processing beginning with a last paragraph in the text flow and performing the serial composition beginning with a first paragraph in the text flow. The method can further include discontinuing the parallel processing at a point in the text flow where the parallel processing and the serial composition meet, the serial composition can define a layout and position for each paragraph prior that has not been parallel processed and can attempt to shuffle the paragraphs that have been parallel processed.

The plurality of paragraphs can be ordered within a text flow, the method can further include performing the serial composition beginning with a first paragraph in the text flow and continuing in order and performing the parallel processing beginning at a predetermined paragraph within the text flow and continuing to a last paragraph in the text flow. The serial composition can define a layout and position for each paragraph from the first paragraph to a paragraph prior to the predefined paragraph and can attempt to shuffle the paragraphs that have been parallel processed.

Determining line breaks of a paragraph can further include using a particular line breaking scheme to determine optimal line breaks for the paragraph text given the predicted frame width. Shuffling can include laying out a first paragraph of the plurality of paragraphs in the document page, determining a vertical position of a last line of the first paragraph within the page, and determining a vertical position of a next paragraph using the determining vertical position.

In general, in one aspect, a computer program product is provided. The computer program product is operable to cause data processing apparatus to perform operations including processing a plurality of paragraphs in parallel, including defining a paragraph layout for each paragraph, the paragraph layout including line breaks and composing the text in an electronic document including serially composing each paragraph, the serial composing including shuffling the processed paragraphs into a particular position within a page frame of the electronic document.

In general, in one aspect, a system is provided. The system includes a user interface device and one or more computers operable to interact with the user interface device. The one or more computers are also operable to process a plurality of paragraphs in parallel, including defining a paragraph layout for each paragraph, the paragraph layout including line breaks and compose the text in an electronic document including serially composing each paragraph, the serial composing including shuffling the processed paragraphs into a particular position within a page frame of the electronic document.

Implementations of the system can include one or more of the following features. The one or more computers can include a server operable to interact with the user interface device through a data communication network, and the user interface device can be operable to interact with the server as a client. The user interface device can include a personal computer running a web browser or a mobile telephone running a WAP browser. The one or more computers can include one personal computer, and the personal computer comprises the user interface device.

Particular embodiments of the subject matter described in this specification can be implemented to realize one or more of the following advantages. Processing paragraph layout in parallel prior to composing text within an electronic document reduces composition time, in particular for long text flows (e.g., a book). The use of multiple threads, in particular with systems including multi-core processors, enhances text composition speed. Paragraphs can be rapidly shuffled into position by a serial process composing paragraphs having already defined paragraph layouts.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
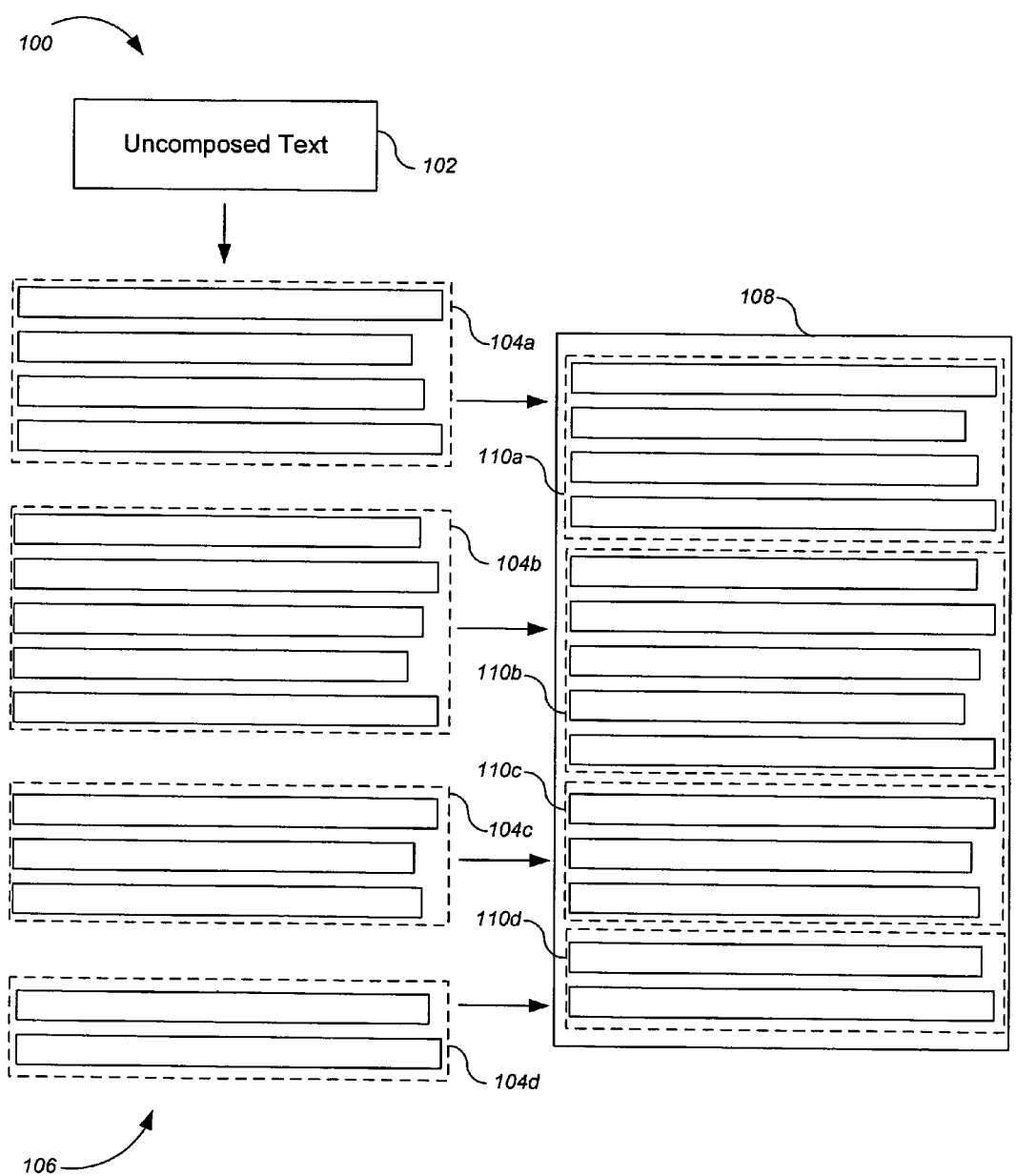
FIG. 1 illustrates an example block diagram of text composition.

FIG. 1 illustrates an example block diagram 100 of steps in text composition. Uncomposed text 102 includes a text flow having a number of paragraphs. Prior to composition, the text is an unbroken flow without a position in a document layout. Processing individual paragraphs of the text defines a paragraph layout for each of the individual paragraphs. This processing determines line breaks within each paragraph as shown in paragraphs 104a, 104b, 104c, and 104d. Each of the paragraphs 104a-104d is broken into one or more lines, where the line breaks are determined according to a particular line breaking scheme.

In some implementations, a portion or all of the paragraphs in the uncomposed text 102 are processed in parallel, resulting in a set of processed paragraphs 106. The paragraphs 104a-104d in the set of processed paragraphs 106 have a defined paragraph layout but not a position within the page frame. To complete the text composition process, paragraphs 104a-104d are composed within a page frame 108. Each paragraph 104a, 104b, 104c, and 104d is serially positioned within the page frame 108 to form composed paragraphs 110a, 110b, 110c, and 110d. Thus, paragraph 110a corresponds to paragraph 104a positioned within the page frame 108. Similarly, paragraph 110b corresponds to paragraph 104b positioned in the page frame 108 relative to paragraph 110a. Each subsequent paragraph 110 is similarly composed in the page frame according to the vertical position of the previous paragraph 110.

Figure 2:
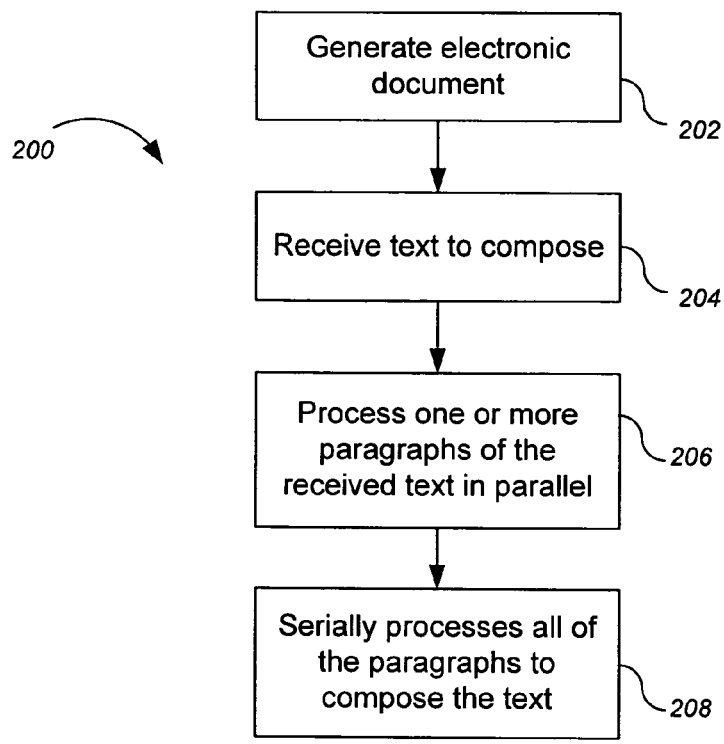
FIG. 2 illustrates an example process of text composition.

FIG. 2 illustrates an example process 200 of text composition. For convenience, the process will be described with reference to a computer system that performs the process (e.g., as part of a publishing application). The system generates an electronic document (step 202). Alternatively, a user can retrieve an existing electronic document into which text can be added or previously composed text can be modified. An electronic document (which for brevity will simply be referred to as a document) does not necessarily correspond to a file. A document may be stored in a portion of a file that holds other documents, in a single file dedicated to the document in question, or in multiple coordinated files.

The document includes one or more pages. Each page has a page frame defining the boundaries for laying out text. In some implementations, the frame is constant throughout the pages of the document. The frame can be predefined, for example, according to one or more templates, or user defined. Alternatively, an existing document can be received, for example, as a file selected by a user.

The system receives text to compose (step 204). The text to compose is received, for example, as part of a file. The file can be locally stored or retrieved from a remote location. The text to compose can be received, for example, in response to a user selection of a particular file. Additionally, the system can include a publishing application in which text can be composed to fit one or more page frames (e.g., a layout for a book). The text can be generated by a user using the same or a different application. For example, the text can be generated using a first application and then imported into a second application for composition. The received text includes a number of individual paragraphs.

The system processes some or all of the paragraphs in the received text in parallel (step 206). Two or more of the paragraphs can be concurrently processed, for example, using multiple processing threads. The processing of the paragraphs determines line breaks in order to define a paragraph layout for each processed paragraph. The processing disregards the position of the particular paragraph. In some implementations, the processed paragraphs are temporarily stored (e.g., in a queue or a table) for positioning in the page frame to complete the text composition. The parallel paragraph processing is described in greater detail below.

The system serially processes all of the paragraphs to compose the text (step 208). Beginning with a first paragraph, each paragraph in the text is composed in sequential order. The text composition includes positioning each paragraph within a particular output page frame. Following positioning of the first paragraph, the vertical position of each subsequent paragraph within the output page frame is determined according to the position of the previously composed paragraph. For paragraphs that have been processed already to define the paragraph layout, the serial composition simply involves shuffling the paragraph to the correct vertical position. For other paragraphs (e.g., unprocessed paragraphs), the serial composition includes defining a paragraph layout and the position of the paragraph.

In some implementations, the line breaks determined during the parallel paragraph processing result in an incorrect paragraph layout. For example, in some instances a different frame width is applied to a particular portion of a composition (e.g., a magazine article having a normal composition of two columns, but where the first page is a single wider column). The serial composition re-breaks the lines in that paragraph in order to define a paragraph layout according to the actual frame width for the position in the page frame corresponding to that paragraph.

Figure 3:
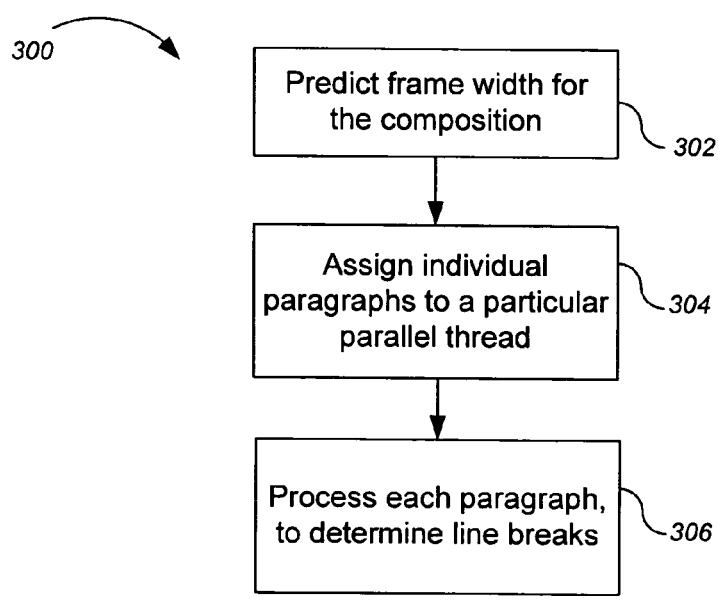
FIG. 3 illustrates an example process for parallel paragraph processing.

FIG. 3 illustrates an example process 300 for parallel paragraph processing. The system predicts a frame width for the composition (step 302). The frame width for a composition can vary both between compositions and within a composition. For example, the frame width can depend on a type of document (e.g., page size for different book formats). Additionally, the frame width can be user defined based on one or more particular preferences. Typically, long text flows (e.g., books) have a consistent frame width throughout the composition. The frame width can be predicted, for example, by assessing the document properties or according to a user input of frame parameters (e.g., when setting up the document).

The system assigns individual paragraphs to a particular parallel thread (step 304). Two or more threads can be provided for processing paragraphs in parallel. Multiple threads allow an application to split actions into simultaneously running tasks. The number of threads can vary depending, for example, on the system capabilities. The multiple threads can operate on a single processor or a multiple processor system. Alternatively, other forms of parallel processing can be used other than threads to allow multiple paragraphs to be processed substantially simultaneously, including multiple processes or other technique for processing multiple tasks at the same time.

Each paragraph can be assigned to a particular thread, for example, from a queue of uncomposed paragraphs. In some implementations, paragraphs are assigned to available threads. Once a thread has finished processing a particular paragraph, a next paragraph in the queue is assigned to that thread for processing.

The system processes each assigned paragraph to define a paragraph layout including determining line breaks for the paragraph (step 306). Line breaks are determined according to a particular line breaking scheme. The line breaking scheme takes into account at least the predicted frame width, but can include a number of other text parameters in order to determine optimal line breaks for the paragraph. Text parameters used to determine an optimal line break include fonts, glyphs, and other text attributes. In some implementations, all of the possible line breaks for the paragraph are examined to identify an optimal set of line breaks for the entire paragraph, for example, by assigning particular penalty values for different line breaks.

Suitable line break schemes are described, for example, in U.S. Pat. No. 6,510,441 and in U.S. Patent Publication No. 2003/0055851, which are incorporated here by reference.

Processed paragraphs are stored for serial positioning within a page frame of the document. If the predicted frame width is correct, the serial process simply shuffles each processed paragraph to a particular position within the page frame (in the correct order) without redefining the paragraph layout.

Figure 4:
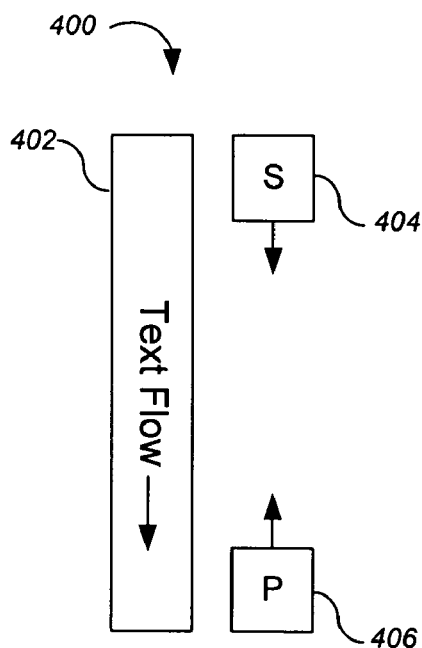
FIGS. 4-6 are block diagrams illustrating example text composition processes.

FIG. 4 is a block diagram 400 illustrating an example text composition process. FIG. 4 illustrates a combination of serial and parallel processing applied to lay out text. The process operates on a text flow 402. The text flow 402 begins at a first paragraph of the text and ends at a last paragraph of the text.

A serial process 404 begins laying out text beginning with the first paragraph of the text in text flow 402. The serial process 404 composes the first paragraph including defining a paragraph layout and positioning the first paragraph within a page frame of the document (i.e., completely composes the first paragraph). The serial process 404 then serially composes subsequent paragraphs in order.

A parallel process 406 begins contemporaneously with the serial process 404. However, the parallel processing begins with the last paragraph of the text in the text flow 402. The parallel process 406 defines paragraph layout for paragraphs in parallel continuing upwards in the text flow 402 toward the first paragraph. The parallel process 406 defines the paragraph layout including determining line breaks for each processed paragraph using a predicted frame width described above. A number of paragraphs can be processed at a same time depending on a number of processing threads used.

When the serial process 404 and parallel process 406 meet the parallel process 406 discontinues. The serial process 404 continues to compose the paragraphs that were processed by the parallel process 406. The serial process 404 shuffles the processed paragraphs into position within the page of the document. Additionally, if a paragraph layout is defined according to an incorrect frame width for that position within the page, the serial process 404 redefines the paragraph layout when positioning that paragraph in the page.

In an alternative implementation, the parallel process 406 can restart using a new predicted frame width if the serial process 404 is redefining paragraph layouts. The new predicted frame width can be selected according to the actual width used by the serial process or some other frame width that more closely matches the actual frame width of the composition. In another implementation, the parallel process 406 can process each paragraph according to multiple frame widths. The different versions of each paragraph can be stored such that the serial process 404 can use the version processed paragraph that more closely matches the actual frame width of the composition.

Figure 5:
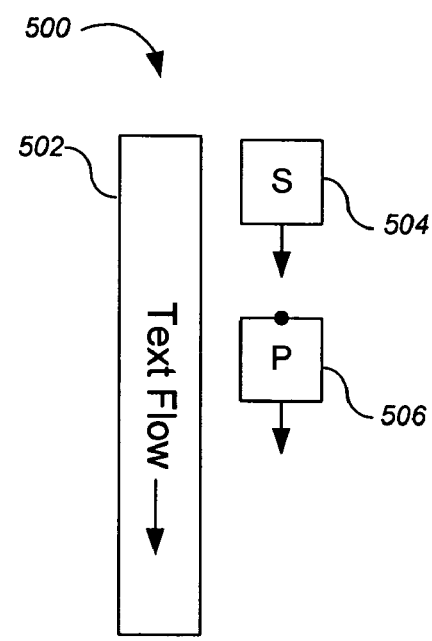

FIG. 5 is a block diagram 500 illustrating an example text composition process. FIG. 5 illustrates a combination of serial and parallel processing applied to lay out text. The process operates on a text flow 502. The text flow 502 begins at a first paragraph of the text and ends at a last paragraph of the text.

A serial process 504 begins laying out text beginning with the first paragraph of the text in text flow 502. The serial process 504 composes the first paragraph including defining a paragraph layout and positioning the first paragraph within a page frame of the document (i.e., completely composes the first paragraph). The serial process 504 then serially composes subsequent paragraphs in order.

A parallel process 506 begins contemporaneously with the serial process 504. However, the parallel processing begins at a predetermined paragraph of the text flow 502. For example, the parallel process 506 can begin with paragraphs starting at a particular point in the text flow 506 (e.g., paragraph 50). The particular paragraph at which to begin the parallel process 506 can be selected to optimize a time for text composition. For example, the starting paragraph can be selected to avoid having the serial process 504 catch up with the parallel process causing unnecessary waiting of the serial process 504.

The parallel process 506 defines paragraph layout for paragraphs in parallel continuing upwards in the text flow 502 toward the first paragraph. The parallel process 506 defines the paragraph layout including determining line breaks for each processed paragraph using a predicted frame width for the document as described above. A number of paragraphs can be processed at a same time depending on a number of processing threads used. The parallel process 506 ends when the last paragraph of the text flow 502 has been processed.

Once the serial process 504 reaches the point in the text flow 502 where the parallel process 506 began, the serial process 504 begins shuffling the processed paragraphs into position. As already discussed, the serial process 504 shuffles processed paragraphs by positioning the paragraphs in order within a page of a document. The paragraph layout of processed paragraphs is not redefined unless the predicted frame width was incorrect for that paragraph position within the document.

Figure 6:
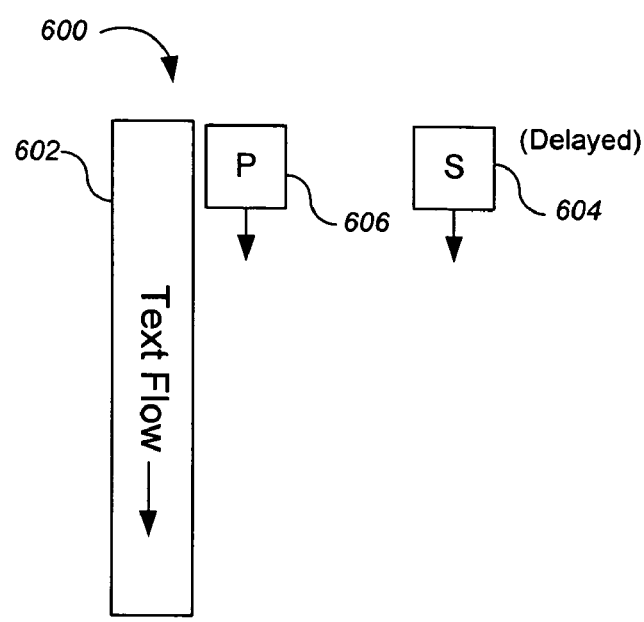

FIG. 6 is a block diagram 600 illustrating an example text composition process. FIG. 6 illustrates a combination of serial and parallel processing applied to lay out text. The process operates on a text flow 602. The text flow 602 begins at a first paragraph of the text and ends at a last paragraph of the text.

A parallel process 606 begins with the first paragraph of the text flow 602. The parallel process 606 defines paragraph layout for paragraphs in parallel continuing downwards in the text flow 602 toward the last paragraph. The parallel process 606 defines the paragraph layout including determining line breaks for each processed paragraph using a predicted frame width for the document as described above. A number of paragraphs can be processed at a same time depending on a number of processing threads used. The parallel process 606 ends when the last paragraph of the text flow 602 has been processed.

After a predefined delay time, a serial process 604 composes text beginning with the first paragraph of the text in text flow 602. The serial process 604 composes the first paragraph including defining a paragraph layout and positioning the first paragraph within a page frame of the document (i.e., completely composes the first paragraph). The serial process 604 then serially composes subsequent paragraphs in order.

In some implementations, the serial process 604 is delayed until the parallel process 606 has completed processing of all the paragraphs in the text flow 602. The serial process 604 then composes all of the paragraphs of the text flow 602 in order beginning with the first paragraph.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results

What is claimed is:

1. A method comprising:
    processing a plurality of paragraphs of text in parallel, including defining a paragraph layout for each paragraph, the paragraph layout including line breaks according to a predicted frame width in an electronic document, where each paragraph of the plurality of paragraphs of text is processed without regard to a position within a page frame of the electronic document in which the paragraph is to be composed; and
    composing the text in the electronic document including serially composing each of the plurality of processed paragraphs, the serial composing including shuffling each processed paragraph into a particular position within the page frame of the electronic document according to an actual frame width for the paragraph,
    where the plurality of paragraphs are ordered within a text flow, the method further comprising:
    performing the parallel processing beginning with a last paragraph in the text flow;
    performing the serial composition beginning with a first paragraph in the text flow; and
    discontinuing the parallel processing at a point in the text flow where the parallel processing and the serial composition meet,
    the serial composition defining a layout and position for each paragraph prior that has not been parallel processed and attempting to shuffle the paragraphs that have been parallel processed.

2. The method of claim 1, where processing the plurality of paragraphs further comprises:
    identifying the predicted frame width for the document; and
    determining the line breaks for each paragraph using the predicted frame width.

3. The method of claim 2, the composing further comprising:
    determining if the predicted frame width corresponds to the actual frame width for each paragraph; and
    if the actual frame width is different from the predicted frame width for a paragraph, redefining the paragraph layout using the actual frame width.

4. The method of claim 1, where processing a plurality of paragraphs in parallel comprises:
    assigning a first paragraph to a first processing thread;
    assigning a second paragraph to a second processing thread;
    determining that the first processing thread has completed processing of the first paragraph; and
    assigning a next paragraph to the first processing thread.

5. The method of claim 4, where each paragraph of the plurality of paragraphs is placed in a queue and assigned to a particular processing thread according to a position in the queue.

6. The method of claim 1, where determining line breaks of a paragraph further comprises using a particular line breaking scheme to determine optimal line breaks for the paragraph text given the predicted frame width.

7. The method of claim 1, where shuffling includes:
    laying out a first paragraph of the plurality of paragraphs in the document page;
    determining a vertical position of a last line of the first paragraph within the page; and
    determining a vertical position of a next paragraph using the determining vertical position.

8. A method comprising:
    processing a plurality of paragraphs of text in parallel, including defining a paragraph layout for each paragraph, the paragraph layout including line breaks according to a predicted frame width in an electronic document, where each paragraph of the plurality of paragraphs of text is processed without regard to a position within a page frame of the electronic document in which the paragraph is to be composed; and
    composing the text in the electronic document including serially composing each of the plurality of processed paragraphs, the serial composing including shuffling each processed paragraph into a particular position within the page frame of the electronic document according to an actual frame width for the paragraph,
    where the plurality of paragraphs are ordered within a text flow, the method further comprising:
    performing the serial composition beginning with a first paragraph in the text flow and continuing in order; and
    performing the parallel processing beginning at a predetermined paragraph within the text flow and continuing to a last paragraph in the text flow,
    the serial composition defining a layout and position for each paragraph from the first paragraph to a paragraph prior to the predefined paragraph and attempting to shuffle the paragraphs that have been parallel processed.

9. A computer program product, encoded on a computer-readable medium, operable to cause data processing apparatus to perform operations comprising:
    processing a plurality of paragraphs of text in parallel, including defining a paragraph layout for each paragraph, the paragraph layout including line breaks according to a predicted frame width in an electronic document, where each paragraph of the plurality of paragraphs of text is processed without regard to a position within a page frame of the electronic document in which the paragraph is to be composed; and composing the text in the electronic document including serially composing each of the plurality of processed paragraphs, the serial composing including shuffling each processed paragraph into a particular position within the page frame of the electronic document according to an actual frame width for the paragraph, where the plurality of paragraphs are ordered within a text flow, the operations further comprising:

performing the parallel processing beginning with a last paragraph in the text flow;

performing the serial composition beginning with a first paragraph in the text flow; and discontinuing the parallel processing at a point in the text flow where the parallel processing and the serial composition meet, the serial composition defining a layout and position for each paragraph prior that has not been parallel processed and attempting to shuffle the paragraphs that have been parallel processed.

10. The computer program product of claim 9, where processing the plurality of paragraphs further comprises:

identifying the predicted frame width for the document; and determining the line breaks for each paragraph using the predicted frame width.

11. The computer program product of claim 10, the composing further comprising:

determining if the predicted frame width corresponds to the actual frame width for each paragraph; and if the actual frame width is different from the predicted frame width for a paragraph, redefining the paragraph layout using the actual frame width.

12. The computer program product of claim 9, where processing a plurality of paragraphs in parallel comprises:

assigning a first paragraph to a first processing thread;

assigning a second paragraph to a second processing thread;

determining that the first processing thread has completed processing of the first paragraph; and assigning a next paragraph to the first processing thread.

13. The computer program product of claim 12, where each paragraph of the plurality of paragraphs is placed in a queue and assigned to a particular processing thread according to a position in the queue.

14. The computer program product of claim 9, where determining line breaks of a paragraph further comprises using a particular line breaking scheme to determine optimal line breaks for the paragraph text given the predicted frame width.

15. The computer program product of claim 9, where shuffling includes:

laying out a first paragraph of the plurality of paragraphs in the document page;

determining a vertical position of a last line of the first paragraph within the page; and determining a vertical position of a next paragraph using the determining vertical position.

16. A computer program product, encoded on a computer-readable medium, operable to cause data processing apparatus to perform operations comprising:

processing a plurality of paragraphs of text in parallel, including defining a paragraph layout for each paragraph, the paragraph layout including line breaks according to a predicted frame width in an electronic document, where each paragraph of the plurality of paragraphs of text is processed without regard to a position within a page frame of the electronic document in which the paragraph is to be composed; and composing the text in the electronic document including serially composing each of the plurality of processed paragraphs, the serial composing including shuffling each processed paragraph into a particular position within the page frame of the electronic document according to an actual frame width for the paragraph, where the plurality of paragraphs are ordered within a text flow, the operations further comprising:

performing the serial composition beginning with a first paragraph in the text flow and continuing in order; and performing the parallel processing beginning at a predetermined paragraph within the text flow and continuing to a last paragraph in the text flow, the serial composition defining a layout and position for each paragraph from the first paragraph to a paragraph prior to the predefined paragraph and attempting to shuffle the paragraphs that have been parallel processed.

17. A system comprising:

a user interface device; and one or more computers operable to interact with the user interface device and to:

process a plurality of paragraphs of text in parallel, including defining a paragraph layout for each paragraph, the paragraph layout including line breaks according to a predicted frame width in an electronic document, where each paragraph of the plurality of paragraphs of text is processed without regard to a position within a page frame of the electronic document in which the paragraph is to be composed; and compose the text in the electronic document including serially composing each of the plurality of processed paragraphs, the serial composing including shuffling each processed paragraph into a particular position within the page frame of the electronic document according to an actual frame width for the paragraph, where the plurality of paragraphs are ordered within a text flow, and the one or more computers further operable to interact with the user interface device to:

perform the parallel processing beginning with a last paragraph in the text flow;

perform the serial composition beginning with a first paragraph in the text flow; and discontinue the parallel processing at a point in the text flow where the parallel processing and the serial composition meet, the serial composition defining a layout and position for each paragraph prior that has not been parallel processed and attempting to shuffle the paragraphs that have been parallel processed.

18. The system of claim 17, wherein the one or more computers comprise a server operable to interact with the user interface device through a data communication network, and the user interface device is operable to interact with the server as a client.

19. The system of claim 18, wherein the user interface device comprises a personal computer running a web browser or a mobile telephone running a WAP browser.

20. The system of claim 17, wherein the one or more computers comprises one personal computer, and the personal computer comprises the user interface device.

21. The system of claim 17, where processing the plurality of paragraphs further comprises:
- identifying the predicted frame width for the document; and
- determining the line breaks for each paragraph using the predicted frame width.

22. The system of claim 21, the composing further comprising:
- determining if the predicted frame width corresponds to the actual frame width for each paragraph; and
- if the actual frame width is different from the predicted frame width for a paragraph, redefining the paragraph layout using the actual frame width.

23. The system of claim 17, where processing a plurality of paragraphs in parallel comprises:
- assigning a first paragraph to a first processing thread;
- assigning a second paragraph to a second processing thread;
- determining that the first processing thread has completed processing of the first paragraph; and
- assigning a next paragraph to the first processing thread.

24. The system of claim 23, where each paragraph of the plurality of paragraphs is placed in a queue and assigned to a particular processing thread according to a position in the queue.

25. The system of claim 17, where determining line breaks of a paragraph further comprises using a particular line breaking scheme to determine optimal line breaks for the paragraph text given the predicted frame width.

26. The system of claim 17, where shuffling includes:
- laying out a first paragraph of the plurality of paragraphs in the document page;
- determining a vertical position of a last line of the first paragraph within the page; and
- determining a vertical position of a next paragraph using the determining vertical position.

27. A system comprising:
a user interface device; and
one or more computers operable to interact with the user interface device and to:
- process a plurality of paragraphs of text in parallel, including defining a paragraph layout for each paragraph, the paragraph layout including line breaks according to a predicted frame width in an electronic document, where each paragraph of the plurality of paragraphs of text is processed without regard to a position within a page frame of the electronic document in which the paragraph is to be composed; and
- compose the text in the electronic document including serially composing each of the plurality of processed paragraphs, the serial composing including shuffling each processed paragraph into a particular position within the page frame of the electronic document according to an actual frame width for the paragraph, where the plurality of paragraphs are ordered within a text flow, the one or more computers further operable to interact with the user interface device to:
perform the serial composition beginning with a first paragraph in the text flow and continuing in order; and
perform the parallel processing beginning at a predetermined paragraph within the text flow and continue to a last paragraph in the text flow,
the serial composition defining a layout and position for each paragraph from the first paragraph to a paragraph prior to the predefined paragraph and attempting to shuffle the paragraphs that have been parallel processed.

* * * * *